(12) United States Patent
Kawai et al.

(10) Patent No.: US 8,372,785 B2
(45) Date of Patent: Feb. 12, 2013

(54) METHOD FOR IMMOBILIZING SELF-ORGANIZING MATERIAL OR FINE PARTICLE ON SUBSTRATE, AND SUBSTRATE MANUFACTURED BY USING SUCH METHOD

(75) Inventors: Tomoji Kawai, Mino (JP); Hitoshi Tabata, Kashiwa (JP); Yoichi Otsuka, Kawasaki (JP); Fumihiko Yamada, Higashiosaka (JP); Takuya Matsumoto, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 2 days.

(21) Appl. No.: 12/923,470

(22) Filed: Sep. 23, 2010

(65) Prior Publication Data

US 2011/0021381 A1 Jan. 27, 2011

Related U.S. Application Data

(60) Division of application No. 11/819,222, filed on Jun. 26, 2007, now Pat. No. 7,829,546, which is a continuation-in-part of application No. PCT/JP2005/023981, filed on Dec. 27, 2005.

(30) Foreign Application Priority Data

Dec. 28, 2004 (JP) ................................. 2004-381549

(51) Int. Cl.
*C04B 40/00* (2006.01)
*C04B 40/04* (2006.01)
*C04B 40/06* (2006.01)
*C04B 50/18* (2006.01)
*B05D 3/12* (2006.01)

(52) U.S. Cl. ................ 506/13; 506/15; 506/16; 506/18; 506/19; 506/32; 514/44; 427/327; 427/328; 427/372.2; 75/362

(58) Field of Classification Search ........................ None
See application file for complete search history.

(56) References Cited

U.S. PATENT DOCUMENTS

| | | | |
|---|---|---|---|
| 6,121,075 A | 9/2000 | Yamashita | 438/149 |
| 6,287,928 B1 | 9/2001 | Yamashita | 438/311 |
| 6,303,516 B1 | 10/2001 | Morita et al. | 438/758 |
| 6,319,738 B1 | 11/2001 | Yamashita | 438/22 |
| 6,342,716 B1 | 1/2002 | Morita et al. | 257/315 |
| 6,766,817 B2 | 7/2004 | da Silva | |
| 6,918,404 B2 | 7/2005 | Dias da Silva | |
| 6,994,964 B1 | 2/2006 | Chang et al. | |
| 7,066,586 B2 | 6/2006 | da Silva | |
| 7,419,529 B2 | 9/2008 | Yoshii et al. | |
| 2002/0013037 A1 | 1/2002 | Yamashita | 438/479 |
| 2002/0091245 A1 | 7/2002 | Ford et al. | |
| 2002/0128234 A1 | 9/2002 | Hubbell et al. | |
| 2003/0209703 A1 | 11/2003 | Yamashita | 257/9 |
| 2004/0248165 A1 | 12/2004 | Takiguchi et al. | |
| 2006/0070494 A1 | 4/2006 | Yoshii et al. | 75/365 |
| 2006/0134672 A1 | 6/2006 | Chang et al. | |

FOREIGN PATENT DOCUMENTS

| | | |
|---|---|---|
| JP | 11-233752 | 8/1999 |
| JP | 2001-178470 | 7/2001 |
| JP | 2002-223016 | 8/2002 |
| JP | 2003-121437 | 4/2003 |
| JP | 2003-516519 | 5/2003 |
| JP | 2004-069355 | 3/2004 |
| JP | 2004/294240 | 10/2004 |
| JP | 2004-317314 | 11/2004 |
| JP | 2004/323859 | 11/2004 |
| JP | 3649588 | 2/2005 |
| JP | 3653970 | 3/2005 |
| JP | 2005-113806 | 4/2005 |
| WO | WO 97/38801 | 10/1997 |
| WO | WO 2005/117126 | 12/2005 |

OTHER PUBLICATIONS

PCT/ISA/210.
Storhoff, James J., et al., "Programmed Materials Synthesis with DNA," *Chemical Reviews*, 1999, vol. 99, No. 7, pp. 1849-1862.
Fodor, Stephen P.A., et al., "Light-Directed, Spatially Addressable Parallel Chemical Synthesis," *Science*; Feb. 15, 1991; 251, 4995; ProQuest Agriculture Journals, pp. 767-773.
Schena, Mark, et al., "Quantitative Monitoring of Gene Expression Patterns with a Complementary DNA Microarray," *Science*; Oct. 20, 1995; 270, 5235; ProQuest Agriculture Journals, pp. 467-470.
Guo, Zhen, etal., "Direct fluorescence analysis of genetic polymorphisms by hybridization with oligonucleotide arrays on glass supports," *Nucleaic Acids Research*, 1994, vol. 22, No. 24, pp. 5456-5465.
Bensimon, D., et al., "Stretching DNA with a Receding Meniscus: Experiments and Models," *Physical Review Letters* vol. 74, No. 23; Jun. 5, 1995, pp. 4754-4757.
Ye, Jing Yong, et al., "Atomic Force Microscopy of DNA Molecules Stretched by Spin-Coating Technique," *Analytical Biochemistry 281* (2000), pp. 21-25.
Dunlap, David D., et al., "Nanoscopic structure of DNA condensed for gene delivery," *Nucleic Acids Research*, 1997, vol. 25, No. 15, p. 3095.
Lyubchenko, Yuri L., et al., "Visualization of supercoiled DNA with atomic force microscopy in situ," *Proc. Natl. Acad. Sci. USA* vol. 94, Jan. 1997, Biophysics, pp. 496.
Allemand, J.-F., et al., "pH-Dependent Specific Binding and Combing of DNA," *Biophysical Journal* vol. 73, Oct. 1997, pp. 2064-2070.

(Continued)

*Primary Examiner* — Geraldina Visconti
(74) *Attorney, Agent, or Firm* — Harness, Dickey & Pierce, P.L.C.

(57) ABSTRACT

A method for immobilizing a self-organizing material or fine particles on a substrate, and a substrate whereupon the self-organizing material or the fine particles are immobilized. More specifically, the method for immobilizing the fine particles including a nucleic acid (for instance, DNA or RNA) or a metal oxide on the substrate, and the substrate whereupon the nucleic acid (for example, DNA or RNA) or the metal oxide is immobilized.

14 Claims, 12 Drawing Sheets

OTHER PUBLICATIONS

Yoshida, K., et al., "Fabrication of a New Substrate for Atomic Force Microscopic Observation of DNA Molecules from an Ultrasmooth Sapphire Plate," *Biophysical Journal* vol. 74 Apr. 1998, pp. 1654-1657.

Washizu, Masao, et al., "Applications of Electrostatic Stretch-and-Positioning of DNA," *IEEE Transactions on Industry Applications*, vol. 31, No. 3, May/Jun. 1995, pp. 447-456.

Xu, B., et al., "The contribution of poly-L-lysine, epidermal growth factor and streptavidin to EGF/PLL/DNA polyplex formation," *Gene Therapy* (1998) 5 pp. 1235-1243.

Japanese Office Action dated May 11, 2010 in corresponding Japanese Application No. 2006-550826, with English translation.

Gruneberg, et al., "Photo-dimerized monolayers for liquid crystal alignment", SPIE vol. 3475; , pp. 35-39 (Jul. 1998).

Ushiyama et al., "Formation and Evaluation of Fluroralkylsilane Monomolecular Film", Abstracts of the Conference of the Surface Finishing Society of Japan, vo. 98, pp. 74-75 (Oct. 2, 1998), with full English translation.

Morimoto, "The Heat of Chemisorption of Water on Metal Oxides in Connection with the Two-Dimensional Condensation of Water", Netsusokutei, vol. 7, No. 2, pp. 43-49 (May 10, 1980), with partial English translation.

Moon et al., "Nanotribology of Si Oxide Layers on Si Surfaces by AFM", Journal of the Vacuum Society of Japan, vol. 44, No. 3, p. 393, Osaka, Japan (Mar. 20, 2001), with full English translation.

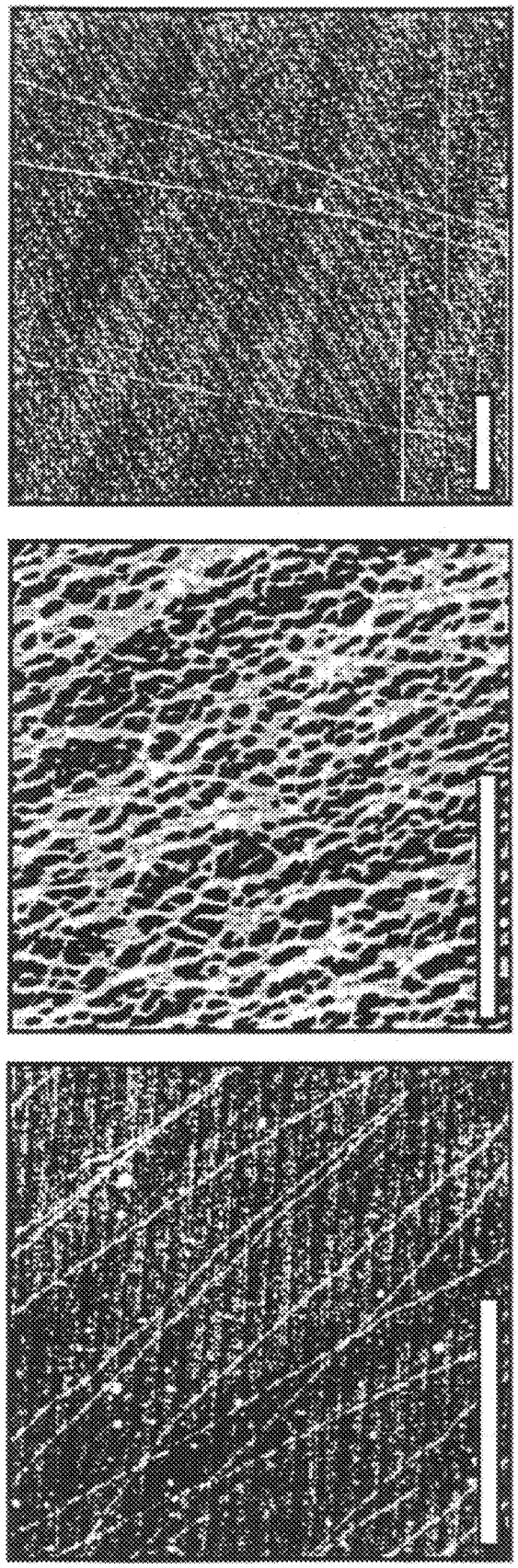

FIG. 4(a) GLASS
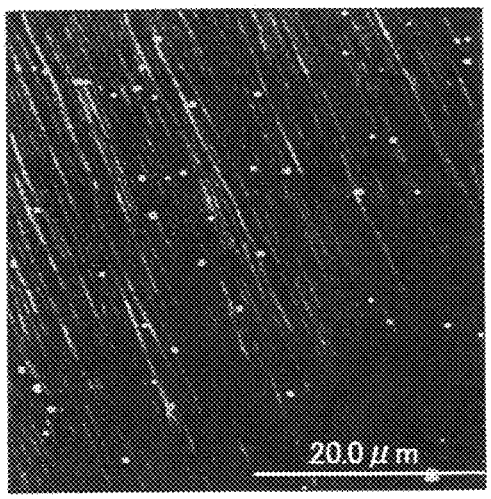
FIG. 4(b) SAPPHIRE
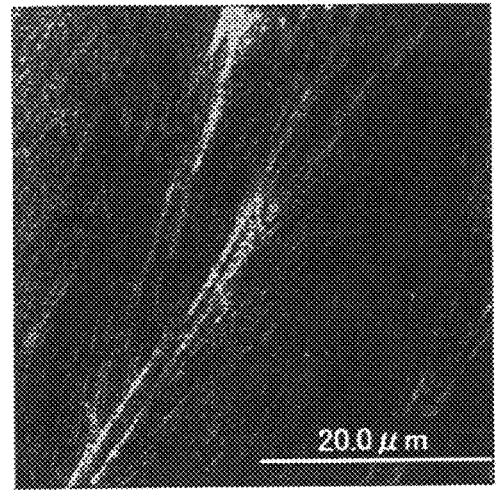
FIG. 5(a) ONLY DNA (Poly(dA)-Poly(dT))
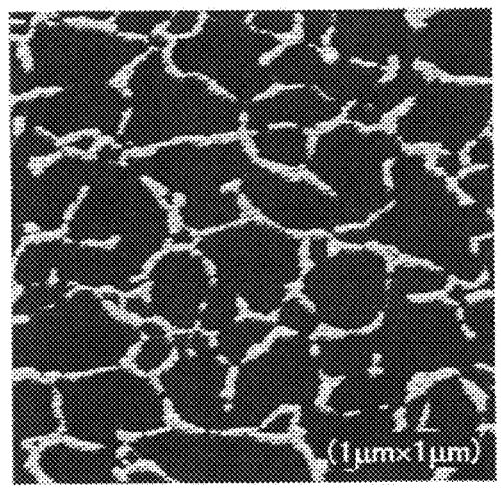
FIG. 5(b) ONLY NANOPARTICLES (DIAMETER=5nm)
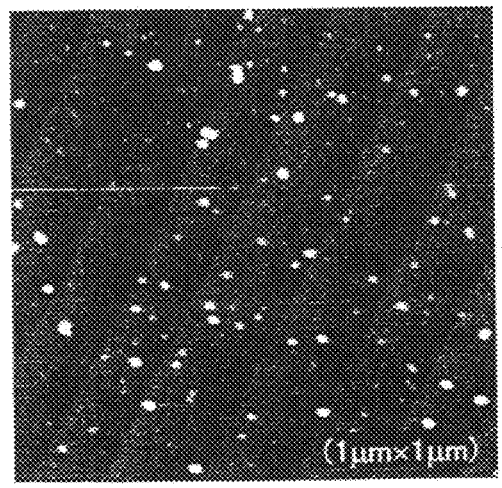

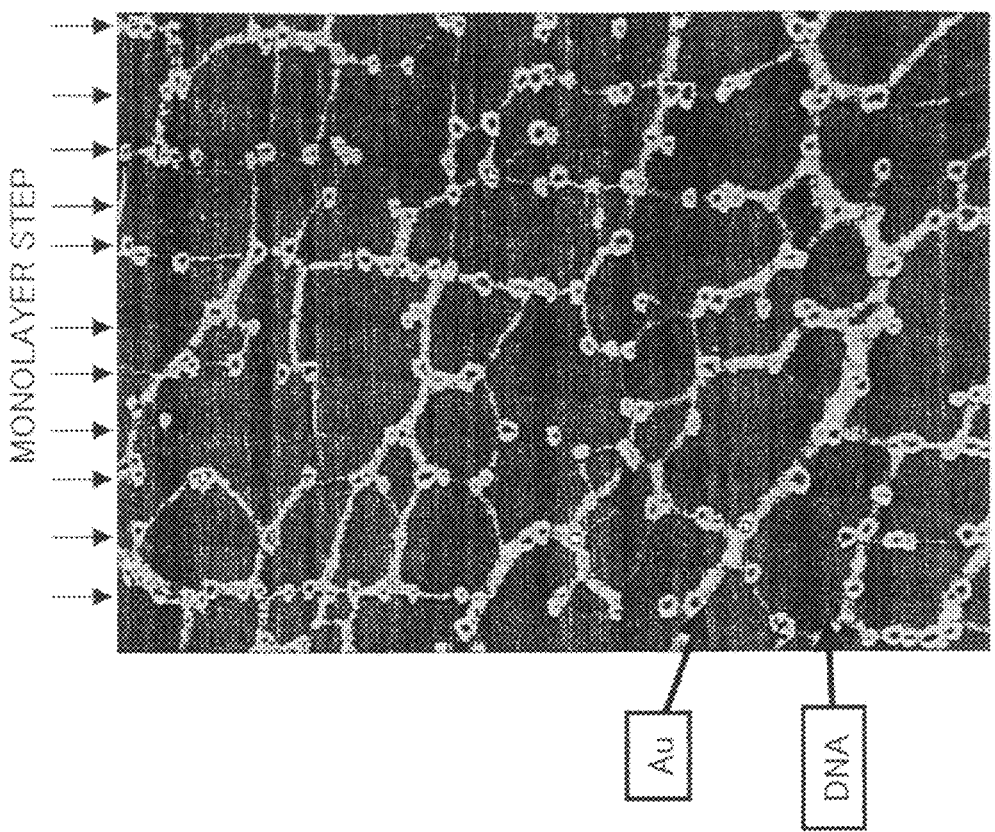
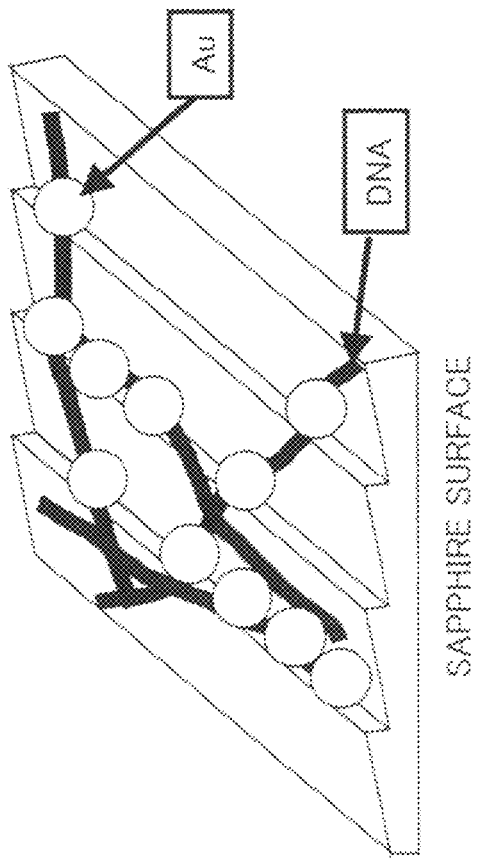

MOLD (SiO₂)

DNA PATTERN

MOLD (SiO₂)

DNA PATTERN

METHOD FOR IMMOBILIZING SELF-ORGANIZING MATERIAL OR FINE PARTICLE ON SUBSTRATE, AND SUBSTRATE MANUFACTURED BY USING SUCH METHOD

CROSS-REFERENCE TO RELATED APPLICATIONS

This application is a divisional of U.S. patent application Ser. No. 11/819,222 filed on Jun. 26, 2007, now U.S. Pat. No. 7,829,546, which is a continuation-in-part (CIP) under 35 U.S.C. §371 of PCT International Application No. PCT/JP2005/023981 which has an international filing date of Dec. 27, 2005, which designated the United States of America and which claims priority on Japanese Patent Application No. 2004-381549 filed Dec. 28, 2004, the entire contents of each of which are hereby incorporated herein by reference.

TECHNICAL FIELD

The present invention relates to a method for immobilizing a self-organizing material or fine particles on a substrate, and a substrate whereupon the self-organizing material or the fine particles are immobilized. Specifically, the invention relates to a method for immobilizing fine particles including a nucleic acid (for instance, DNA or RNA) or a metal oxide on a substrate, and a substrate whereupon the nucleic acid (for example, DNA or RNA) or the metal oxide is immobilized.

BACKGROUND ART

In the medical field, there is high expectation for diagnosis, treatment or prevention of diseases using genes (gene diagnosis). By examining defects or changes in causal genes of particular diseases for example, the gene diagnosis allows for diagnosis, treatment or prevention before onset of disease or at early stages of disease. The gene diagnosis also realizes what is known as tailor made medicine, which is based on relationships between genotype and disease as revealed by human genome analysis. In view of this, a further development is expected for easy detection of genes and/or easy determination of genotypes.

As a tool for gene detection and/or genotype determination, a DNA chip (DNA microarray, or more generally nucleic acid immobilizing substrate) has been available that is used to hybridize a subject sample with nucleic acids immobilized on a substrate or a support. The DNA chip is considered to be useful in applications including not only basic medical science but clinical medicine, drug creation and/or preventive medicine as well.

The nucleic acid immobilizing substrate is also important for the development of nucleic acid-based nanotechnology (for example, nano wires, and nucleic acid-based nano electronics such as bio-sensors and bio-chips) (see Non-Patent Publication 1, for example).

In detection of nucleic acid based on a hybridization method, there has been proposed a method in which a sample containing a nucleic acid (target DNA) complementary to a nucleic acid probe such as a DNA fragment is immobilized on a support such as a nitrocellulose film and is allowed to react with the nucleic acid probe in a solution (see Non-Patent Publication 2, for example).

As a method by which nucleic acids used for the DNA chip are immobilized on a substrate, a method is known that directly synthesizes a nucleic acid probe on a substrate (see Non-Patent Publication 3, for example). As another method of immobilizing nucleic acids on a support, there has been known a method in which a nucleic acid probe is immobilized on a support after it has been prepared beforehand (see Non-Patent Publication 4, for example).

In another known method, a solid-phase support that has been surface-treated with a silane coupling agent including functional groups such as an amino group or an aldehyde group is covalently bonded to a nucleic acid probe having modified functional groups, after spotting with a DNA chip fabricating device (see Non-Patent Publication 5).

Specifically, the following methods have been known as the method of binding a self-organizing material (for example, nucleic acid) on a solid surface: A method in which a substrate surface is treated with silane to introduce therein a vinyl group that can bind to the nucleic acid molecule (see Non-Patent Publication 6, for example); a method in which nucleic acids are bound to a substrate using counter ions (see Non-Patent Publications 7-9, for example); a method in which pH values are chemically controlled to adjust the extent of immobilization on various types of substrate surfaces (see Non-Patent Publication 10, for example); and a method in which $Al_2O_3$ surface is treated with $Na_3PO_4$ solution to render the surface hydrophilic (see Non-Patent Publication 11, for example). As a technique for removing organic impurities from the substrate surface, there has been known a method in which the molecules on the substrate surface are modified by an oxygen plasma process which requires expensive equipment (see Patent Publications 1 and 2, for example).

In the field of electronics, there has been report that nucleic acids show strong bonding, similar to covalent bond, with respect to aluminum electrodes (see Non-Patent Publication 12, for example).

[Patent Publication 1]
WO97/38801 (published on Oct. 23, 1997)
[Patent Publication 2]
Japanese Laid-Open Patent Publication No. 2002-218976 (published on Aug. 6, 2002)
[Non-Patent Publication 1]
Storhoff, J. J. and Mirkin, C. A.: Chem. Rev. 99, 1849-1862 (1999)
[Non-Patent Publication 2]
Molecular Cloning 2nd. Ed. (Cold Spring Harbor Press)
[Non-Patent Publication 3]
Forder, S. P. A. et al, Science, 251, 767-773 (1991)
[Non-Patent Publication 4]
Schena, M. et al., Science, 270, 467-470 (1995)
[Non-Patent Publication 5]
Geo, Z. et al., Nucleic Acid Research, 22, 5456-5465 (1994)
[Non-Patent Publication 6]
Bensimon, D. et al., Physical Review Letters 74, 23, 4754-4757 (1995)
[Non-Patent Publication 7]
Ye, J. Y. et al., Analytical Biochemistry 281, 21-25 (2000)
[Non-Patent Publication 8]
Dunlap, D. D. et al., Nucl. Acid Res. 25, 3095 (1997)
[Non-Patent Publication 9]
Lyubchenko, Y. L. et al., Proc. Natl. Acad. Sci. USA 94, 496 (1997)
[Non-Patent Publication 10]
Allemand, J. F. et al., Biophysical Journal, 73, 2064-2070 (1997)
[Non-Patent Publication 11]
Yoshida, K. et al., Biophysical Journal, 74, 1654-1657 (1998)
[Non-Patent Publication 12]
Washizu, M. et al., IEEE Trans. Industr. Appl., 31, 3, 447-456 (1995)

As an application of the method described in Non-Patent Publication 3, there has been known a method in which a nucleic acid probe is synthesized on a glass slide or a silicon substrate using a photolithography technique, employed in fabrication of semiconductors, in combination with a solid-phase synthesis technique. A drawback of the on-chip synthesis method, however, is that it requires special equipment and reagents for synthesizing a nucleic acid probe on the substrate, and that it can synthesize nucleic acid probes of only about several ten bases long.

As an application of the method described in Non-Patent Publication 4, a method is known in which a nucleic acid probe that has been prepared in advance using a DNA chip fabricating device is spotted for electrostatic bonding on a surface of a solid-phase support that has been surface-treated with poly-L-lysine or the like. While such an electrostatic bonding method of nucleic acid probe allows for immobilization of long nucleic acid probes, it lacks reproducibility due to procedures of hybridization reactions.

The method described in Non-Patent Publication 5 can be used to bond the nucleic acid probe onto a solid-phase support relatively firmly. However, preparation of nucleic acid probe requires the tedious procedures of PCR amplification using oligonucleotides with modified functional groups. Further, due to difficulties of the method in preparing a nucleic acid probe extending several thousand bases, identification of long nucleic acid probes is inevitably difficult.

As described above, as the technique for binding nucleic acid molecules on a substrate surface, there have been used (1) a method of modifying molecules on a substrate surface, or (2) a method of subjecting a substrate surface with a plasma process. However, the method employing molecule modification requires many steps and large equipment. Likewise, the plasma process calls for large-scale equipment and large cost. That is, it has not been possible with the conventional techniques to directly bind the nucleic acid molecules, both easily and inexpensively, on a substrate surface.

In studying DNA structures and a complex thereof, or electrical characteristics of DNA structure, the inventors of the present invention found that it was important to immobilize or extend DNA on an atomically flat substrate in order to rule out the influence of substrate structure. Immobilization of DNA is well researched. Mica, glass, gold, and highly oriented pyrolytic graphite (HOPG) are commonly used as the substrate. Mica and HOPG can be cut very easily to provide an atomically flat substrate. However, cations (for example, magnesium ion or nickel ion) are required in order to hold molecules on the substrate made of these materials. Glass substrates also require surface modification. For example, DNA is immobilized using aminopropyl triethoxysilane (APS). By coating the glass surface, APS forms a positively charged layer with amino groups. The DNA with the phosphate groups (negatively charged) around the double helix is therefore adsorbed on the substrate by the electrostatic force. Gold particles can be used for DNA with thiol ends, because gold can form a covalent bond with the thiol group.

The present invention was made in view of the foregoing problems, and an object of the present invention is to provide a self-organizing material immobilizing substrate that can immobilize a self-organizing material on a substrate surface in a controlled manner from low density to high density, and that can be manufactured at low cost. Specifically, it is an object of the present invention to provide a method for conveniently immobilizing DNA and a method for extending DNA without chemical surface modification (for example, APS process) using other molecules, and a substrate fabricated by such methods. It is another object of the present invention to provide a method for one-dimensionally arranging fine particles on a substrate surface in a desired shape within a square micrometer.

DISCLOSURE OF INVENTION

A method for immobilizing a self-organizing material on a substrate of metal oxide according to the present invention includes the steps of:
applying to the substrate an acid solution capable of introducing a hydroxy group on a surface of the substrate; and
applying a solution containing the self-organizing material onto the substrate after the acid solution is removed from the substrate.

In a method for immobilizing a self-organizing material on a substrate of metal oxide according to the present invention, it is preferable that the self-organizing material be a nucleic acid, a protein, an amino acid, a lipid, or a sugar.

In a method for immobilizing a self-organizing material on a substrate of metal oxide according to the present invention, it is preferable that the metal oxide be $Al_2O_3$, ZnO, $TiO_2$, $SiO_2$, $ZrO_2$, $SrTiO_2$, $LaAlO_3$, $Y_2O_3$, MgO, GGG, YIG, LiTaO, LiNbO, $KTaO_3$, $KNbO_3$, or $NdGaO_3$.

It is preferable that a method for immobilizing a self-organizing material on a substrate of metal oxide according to the present invention further include the step of drying the self-organizing material-containing solution applied to the substrate.

In a method for immobilizing a self-organizing material on a substrate of metal oxide according to the present invention, it is preferable that the drying step be performed by blowing a dry inert gas or air.

A method for arranging fine particles on a substrate of metal oxide according to the present invention includes the steps of:
applying an acid solution to the substrate;
obtaining a mixed solution by mixing a solution containing the fine particles with a solution containing a self-organizing material;
applying the mixed solution to the substrate after the acid solution is removed from the substrate; and
drying the mixed solution applied to the substrate.

In a method for arranging fine particles on a substrate of metal oxide according to the present invention, it is preferable that the fine particles have the same charge as the solution containing the self-organizing material.

In a method for arranging fine particles on a substrate of metal oxide according to the present invention, it is preferable that the self-organizing material be a nucleic acid, a protein, an amino acid, a lipid, or a sugar.

In a method for arranging fine particles on a substrate of metal oxide according to the present invention, it is preferable that the metal oxide be $Al_2O_3$, ZnO, $TiO_2$, $SiO_2$, $ZrO_2$, $SrTiO_2$, $LaAlO_3$, $Y_2O_3$, MgO, GGG, YIG, LiTaO, LiNbO, $KTaO_3$, $KNbO_3$, or $NdGaO_3$.

In a method for arranging fine particles on a substrate of metal oxide according to the present invention, it is preferable that the fine particles comprise gold, silver, platinum, palladium, iridium, rhodium, osmium, ruthenium, nickel, cobalt, indium, copper, $TiO_2$, or $BaTiO_3$.

In a method for arranging fine particles on a substrate of metal oxide according to the present invention, it is preferable that the fine particles have a particle diameter in a range of 1 nm to 100 nm.

In a method for arranging fine particles on a substrate of metal oxide according to the present invention, it is preferable that the drying step be performed by blowing a dry inert gas or air.

A method for arranging fine particles on a substrate in a desired shape according to the present invention includes the steps of:

immobilizing on the substrate a substance capable of binding to a self-organizing material;

imprinting the substance with a mold that has been formed with desired irregularities, so as to pattern the substance in a desired shape;

obtaining a mixed solution by mixing a solution containing the fine particles with a solution containing the self-organizing material;

applying the mixed solution to the patterned substance; and drying the mixed solution applied to the substance.

In a method for arranging fine particles on a substrate in a desired shape according to the present invention, it is preferable that the fine particles have the same charge as the solution containing the self-organizing material.

In a method for arranging fine particles on a substrate in a desired shape according to the present invention, it is preferable that the fine particles comprise gold, silver, platinum, palladium, iridium, rhodium, osmium, ruthenium, nickel, cobalt, indium, copper, $TiO_2$, or $BaTiO_3$.

In a method for arranging fine particles on a substrate in a desired shape according to the present invention, it is preferable that the fine particles have a particle diameter in a range of 1 nm to 100 nm.

In a method for arranging fine particles on a substrate in a desired shape according to the present invention, it is preferable that the self-organizing material be a nucleic acid, a protein, an amino acid, a lipid, or a sugar.

In a method for arranging fine particles on a substrate in a desired shape according to the present invention, it is preferable that the substance be poly-L-lysine or aminosilane.

In a method for arranging fine particles on a substrate in a desired shape according to the present invention, it is preferable that the drying step be performed by blowing a dry inert gas or air.

In a substrate on which a self-organizing material is immobilized according to the present invention, the self-organizing material binds to a hydroxy group that has been formed on a surface of the substrate by acid treatment of the substrate. It is preferable that the self-organizing material form a network structure on the substrate.

In a substrate on which a self-organizing material is immobilized according to the present invention, it is preferable that the self-organizing material be a nucleic acid, a protein, an amino acid, a lipid, or a sugar.

In a substrate on which a self-organizing material is immobilized according to the present invention, it is preferable that the substrate be a metal oxide selected from $Al_2O_3$, ZnO, $TiO_2$, $SiO_2$, $ZrO_2$, $SrTiO_2$, $LaAlO_3$, $Y_2O_3$, MgO, GGG, YIG, LiTaO, LiNbO, $KTaO_3$, $KNbO_3$, or $NdGaO_3$.

In a substrate on which a self-organizing material is immobilized according to the present invention, it is preferable that the self-organizing material carry fine particles. In this case, in a substrate on which a self-organizing material is immobilized according to the present invention, it is more preferable that the self-organizing material form a network structure on the substrate, and that the fine particles be carried on the network structure of the self-organizing material in portions lying on edges of a step structure on the surface of the substrate.

In a substrate on which a self-organizing material is immobilized according to the present invention, it is preferable that the fine particles comprise gold, silver, platinum, palladium, iridium, rhodium, osmium, ruthenium, nickel, cobalt, indium, copper, $TiO_2$, or $BaTiO_3$.

In a substrate on which a self-organizing material is immobilized according to the present invention, it is preferable that the fine particles have a particle diameter in a range of 1 nm to 100 nm.

In a substrate carrying fine particles in a desired shape according to the present invention, a substance capable of binding to a self-organizing material is immobilized on the substrate, and wherein the substance is patterned into a desired pattern and carries the fine particles.

In a substrate carrying fine particles in a desired shape according to the present invention, it is preferable that the fine particles comprise gold, silver, platinum, palladium, iridium, rhodium, osmium, ruthenium, nickel, cobalt, indium, copper, $TiO_2$, or $BaTiO_3$.

In a substrate carrying fine particles in a desired shape according to the present invention, it is preferable that the fine particles have a particle diameter in a range of 1 nm to 100 nm.

In a substrate carrying fine particles in a desired shape according to the present invention, it is preferable that the self-organizing material be a nucleic acid, a protein, an amino acid, a lipid, or a sugar.

In a substrate carrying fine particles in a desired shape according to the present invention, it is preferable that the substance be poly-L-lysine or aminosilane.

A method for binding fine particles to a self-organizing material according to the present invention includes the steps of:

obtaining a mixed solution by mixing a solution containing the fine particles with a solution containing the self-organizing material;

applying the mixed solution to a substrate; and drying the mixed solution applied to the substrate.

In a method for binding fine particles to a self-organizing material according to the present invention, it is preferable that the fine particles have the same charge as the solution containing the self-organizing material.

In a method for binding fine particles to a self-organizing material according to the present invention, it is preferable that the self-organizing material be a nucleic acid, a protein, an amino acid, a lipid, or a sugar.

In a method for binding fine particles to a self-organizing material according to the present invention, it is preferable that the fine particles comprise gold, silver, platinum, palladium, iridium, rhodium, osmium, ruthenium, nickel, cobalt, indium, copper, $TiO_2$, or $BaTiO_3$.

In a method for binding fine particles to a self-organizing material according to the present invention, it is preferable that the fine particles have a particle diameter in a range of 1 nm to 100 nm.

In a method for binding fine particles to a self-organizing material according to the present invention, it is preferable that the drying step be performed by blowing a dry inert gas or air.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2a is a diagram showing DNA molecules that were extended under low concentration conditions on an acid-treated Al$_2$O$_3$ substrate: Scale bar 1 µm.

FIG. 2b is a diagram showing a network structure of DNA that was formed under high concentration conditions on an acid-treated Al$_2$O$_3$ substrate: Scale bar 1 µm.

FIG. 2c is a diagram showing slightly extended DNA molecules under high concentration conditions on an Al$_2$O$_3$ substrate that was not subjected to acid treatment: Scale bar 1 µm.

FIG. 4a is a diagram showing a fluorescent image of DNA molecules immobilized on a surface of an APS-coated glass substrate.

FIG. 4b is a diagram showing a fluorescent image of DNA molecules immobilized on a surface of an acid-treated Al$_2$O$_3$ substrate.

FIG. 5a is a diagram showing adsorption of DNA on an Al$_2$O$_3$ substrate.

FIG. 5b is a diagram showing adsorption of gold nanoparticles on an Al$_2$O$_3$ substrate.

FIG. 7a is a diagram schematically showing a step structure of the Al$_2$O$_3$ substrate, and DNA and gold nanoparticles adsorbed on the Al$_2$O$_3$ substrate using a mixed solution of DNA solution and gold nanoparticle solution.

FIG. 7b is a diagram showing an AFM image (1 µm×1.2 µm) of gold nanoparticles arranged on the Al$_2$O$_3$ substrate using a mixed solution of DNA solution and gold nanoparticle solution.

FIG. 11b is a diagram showing a result of observation of a DNA pattern of a substrate immobilizing DNA on the mold of FIG. 11a.

BEST MODE FOR CARRYING OUT THE INVENTION

Figure 1A:
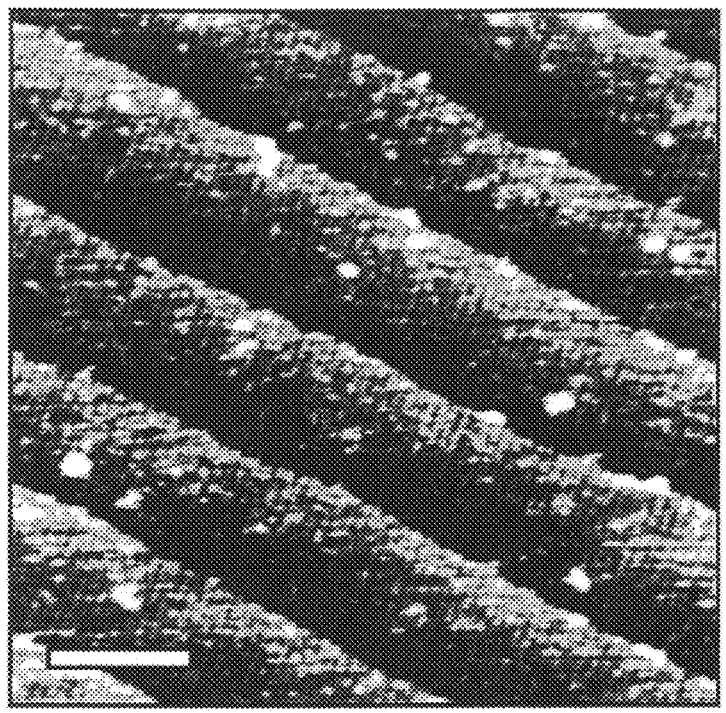
FIG. 1a is a diagram showing an AFM image of $Al_2O_3$ surface that has been treated with an acid solution and is flat at atomic level: Scale bar 100 nm.

In studying immobilization of DNA molecules on a metal oxide substrate treated with an acid solution, the inventors of the present invention confirmed an increase in the hydroxy group on the acid-treated metal oxide substrate in an infrared analysis performed on the substrate. Further, by observing an increase of DNA molecule adsorbed on the acid-treated substrate using an atomic force microscope, it was found that the DNA structure on the substrate was affected by the concentration of a DNA solution. Concerning the effect of acid treatment on DNA binding ability, a comparison was made using a commercially available aminopropyl triethoxysilane (APS)-coated glass substrate used to manufacture DNA-binding substrates. Fluorescent microscope observation of DNA adsorbed on the metal oxide substrate had substantially the same result as that using the APS-treated glass substrate. It should be noted here that the commercially available glass (APS glass) with the surface coating for DNA binding has NH$_3^+$ groups introduced on the surface. This draws the phosphate backbone (negative charge) of the DNA and immobilizes the DNA on the substrate surface.

The inventors of the present invention found that a self-organizing material could be immobilized on a metal oxide substrate with a hydroxy group introduced on a substrate surface by the reaction of the substrate with an acid solution.

As described above, Non-Patent Publication 11 describes a method in which a surface is rendered hydrophilic by the treatment of $Al_2O_3$ surface with a $Na_3PO_4$ solution. The method described in Non-Patent Publication 11 is intended to improve hydrophilicity by applying a sodium phosphate aqueous solution onto the substrate, and this publication suggests that a layer of sodium phosphate is formed on a substrate surface. That is, the substrate fabricated by the method described in Non-Patent Publication 11 has a surface structure that greatly differs from that of the present invention in which "a hydroxy group is introduced on a substrate surface."

In one embodiment, the present invention provides a method for immobilizing a self-organizing material on a substrate including a metal oxide. In one aspect, a method according to the present invention preferably includes the step of applying an acid solution to a substrate; and the step of applying a solution containing a self-organizing material to the substrate after the acid solution is removed. In another aspect, the substrate used in the embodiment is preferably made of metal oxide.

As used herein, a "self-organizing material" is intended a substance capable of forming a structure by spontaneous aggregation of large numbers of molecules (i.e., a substance with self-organizing capability). Examples of a self-organizing material include nucleic acids such as DNA and RNA, bio-molecules such as proteins, amino acids, lipids, and sugars, as well as cells and tissue slices. Nucleic acids (DNA or RNA) are preferable. In applying the self-organizing material on the substrate, it is preferable that the self-organizing material be in the form of an aqueous solution. The concentration of the self-organizing material contained in a solution is not particularly limited. A concentration range of 10 ng/µl to 10 µg/µl is preferable, and a concentration range of 150 ng/µl to 1250 ng/µl used in Examples below is more preferable.

As used herein, the "acid solution" is not particularly limited as long as it is an acidic solution that does not dissolve the substrate (for example, a mixture of hydrogen peroxide solution and hydrochloric acid solution), and that can introduce the hydroxy group on a surface of the substrate used in the present invention.

As used herein, the "metal oxide" is not particularly limited as long as it is an oxide of a stable structure. Preferably, the metal oxide is selected from the group consisting of: $Al_2O_3$, ZnO, $TiO_2$, $SiO_2$, $ZrO_2$, $SrTiO_2$, $LaAlO_3$, $Y_2O_3$, MgO, GGG, YIG, $LiTaO$, $LiNbO$, $KTaO_3$, $KNbO_3$, and $NdGaO_3$. $Al_2O_3$ ($\alpha$-$Al_2O_3$ (0001)) is most preferable.

$Al_2O_3$ has the following advantages over other substrates (for example, mica, glass, HOPG): (1) there is a highly established method of obtaining an atomically flat surface by heat annealing in air; (2) the surface is very stable even under atmospheric pressure; (3) it is optically transparent for visible light; (4) it is an electrical insulator; and (5) it is widely used in industry as is SAW element, which makes it possible to obtain a high-quality single crystals at relatively low cost. $Al_2O_3$ therefore has many advantages in practical applications.

While the present invention has been demonstrated based on examples using $Al_2O_3$ as the substrate, a person ordinary skill in the art from the teaching of the present invention will readily understand that the substrate is not limited to $Al_2O_3$ to obtain the effects of the present invention, and that desired properties and effects can be obtained as long as the substrate includes a metal oxide.

The inventors of the present invention also found that the amount of self-organizing material immobilized on the metal oxide substrate could be increased by introducing a hydroxy group on a substrate surface by the reaction of the substrate with an acid solution, and that arrangement of gold fine particles bound to the self-organizing material could be controlled by blowing a dry inert gas or air when immobilizing the self-organizing material.

In one embodiment, the present invention provides a method for arranging fine particles on the substrate including a metal oxide. In one aspect, a method according to the present embodiment preferably includes the steps of: applying an acid solution onto a substrate; obtaining a mixed solution by mixing a solution containing fine particles with a solution containing a self-organizing material; applying the mixed solution onto the substrate after the acid solution is removed; and drying the mixed solution applied to the substrate. In another aspect, a substrate used in the embodiment is preferably made of metal oxide. In a method according to the embodiment, the fine particles may have the charge different from that of the self-organizing material or may be electrically neutral. Preferably, the fine particles have the same charge as the solution containing the self-organizing material.

As used in the present invention, the "fine particles" are used interchangeably with "nanoparticles," and are preferably made of gold, silver, platinum, palladium, iridium, rhodium, osmium, ruthenium, nickel, cobalt, indium, copper, $TiO_2$, or $BaTiO_3$. Preferably, the fine particles are of the size (particles diameter of 1 nm to 100 nm) that can form a colloidal solution.

The inventors of the present invention also found that the patterning of self-organizing material developed by the inventors were applicable to the present invention.

In one embodiment, the present invention provides a method of arranging fine particles on the substrate in a desired shape. In one aspect, a method according to the present invention includes the steps of: immobilizing on a substrate a substance that can bind to a self-organizing material; patterning the substance in a desired shape by imprinting, using a mold having desired irregularities; obtaining a mixed solution by mixing a solution containing fine particles with a solution containing a self-organizing material; applying the mixed solution on the patterned substrate; and drying the mixed solution applied to the substrate. In a method according to the present embodiment, the fine particles may have the charge different from that of the self-organizing material or may be electrically neutral. Preferably, the fine particles have the same charge as the solution containing the self-organizing material.

As used herein, the "substance that can bind to a self-organizing material" is not particularly limited as long as it can bind to the self-organizing material having self-organizing capability. Preferably, the substance includes poly-L-lysine or aminosilane (for example, APS). More preferably, the substance is made of poly-L-lysine or aminosilane (for example, APS). As used herein, the term "aminosilane" is intended a molecule that can bind to the OH group on a surface of the substrate (for example, glass, silicon, $Al_2O_3$) such that the amino group that binds to the self-organizing material (for example, DNA) is presented on the outermost surface of the substrate.

Poly-L-lysine is known to bind to DNA (B. Xu., S. Wiehle., J A. Roth., and R J. Cristiano., Gene Therapy (5), 1235-1243, 1998), and therefore can be suitably used to immobilize the self-organizing material (DNA in particular). The degree of polymerization of poly-L-lysine is not particularly limited. However, since the binding of poly-L-lysine with DNA is assumed to occur based on the electrostatic interaction between the negative charge due to the phosphate group of the DNA and the positive charge due to the protonated amino acid of poly-L-lysine, it is preferable that the amino groups constituting the binding sites in the poly-L-lysine be interspaced with some distance. Considering this, it is preferable that the degree of polymerization be, but is not limited to, about 20,000.

Aminosilane is widely used for immobilization of biosubstances, and is capable of immobilizing substances with self-organizing capability such as proteins, cells, and tissue slices, in addition to DNA. Thus, by using aminosilane as an immobilizing layer, the substances with self-organizing capability can be immobilized on the substrate in any pattern. For example, a biotransmission circuit can be formed by artificially patterning neurons.

When immobilizing on the substrate a substance that can bind to the self-organizing material, it is preferable that the substrate be formed with an immobilizing layer including the substance that can bind to the self-organizing material, and that the immobilizing layer be formed on the substrate by a technique such as coating or dipping, in order to reliably immobilize the self-organizing material on the substrate.

When using a patterning technique that employs imprinting, the self-organizing material is not necessarily required to be applied in the form of an aqueous solution, as long as the self-organizing material can fill the recesses of the irregular pattern of the immobilizing layer without being denatured.

When the immobilizing layer is a thin film, a method of forming the thin-film layer on the substrate is not particularly limited and various conventional methods can be used. For example, a spin coating method or dipping method may be used. The material of the substrate is not particularly limited as long as it allows for formation of a thin-film layer containing a material having binding ability. For example, the substrate may be an insulating substrate made of glass, resin, or silicon, or may be a semiconductor substrate or a conductive substrate.

By an imprint process, the irregular pattern of the mold can be transferred onto the immobilizing layer formed on the substrate. The mold has been processed into an irregular pattern of a desired shape, and the raised portions of the mold are reflected in the final shape of the self-organizing material.

The material of the mold used in the present embodiment is not particularly limited. Preferably, silicon or silicon dioxide is used according to established microfabrication techniques (for example, lithography). The mold can be processed by methods known in the art. In one preferable method for example, a resist (UV-sensitive organic film) is coated on a thermally-oxidized silicon film and the resist is patterned by directly delineating it with an electron beam, and this followed by dry etching using the resist as a mask.

For the transfer of the irregular pattern of the mold, known imprinting techniques (for example, such as thermal cycle nanoimprint lithography or photo nanoimprint lithography) may be used.

Temperature, pressure, time, or other conditions under which the irregular pattern of the mold is imprinted on the immobilizing layer may be readily decided by a person ordinary skill in the art, taking into account such factors as a throughput reduction due to required time for raising or lowering temperature of the immobilizing layer, a change in dimensions of the immobilizing layer due to temperature changes, accuracy of transfer patterns, and alignment inaccuracy due to thermal expansion.

After the transfer, the mold is detached from the substrate to obtain the immobilizing layer with the irregular pattern. When thermal cycle nanoimprint lithography is used for example, the mold can be detached from the substrate after the immobilizing layer has been hardened by lowering the temperature of the immobilizing layer. When using photo nanoimprint lithography, the mold can be detached from the substrate after the immobilizing layer has been hardened by irradiation of UV light.

In one embodiment, the present invention provides a substrate having a self-organizing material immobilized thereon. In one aspect, it is preferable in a substrate according to the present embodiment that the self-organizing material be bound to the hydroxy group that has been formed on the substrate surface by an acid treatment of the substrate. In another aspect, it is preferable in a substrate according to the present embodiment that the self-organizing material carry fine particles. It is preferable that the fine particles be made of gold, silver, platinum, palladium, iridium, rhodium, osmium, ruthenium, nickel, cobalt, indium, copper, $TiO_2$, or $BaTiO_3$. Preferably, the fine particles are of the size (particles diameter of 1 nm to 100 nm) that can form a colloidal solution.

In one embodiment, the present invention provides a substrate of a desired shape carrying fine particles. In one aspect, it is preferable in a substrate according to the present embodiment that a substance that can bind to the self-organizing material be immobilized on the substrate, and that the substance be patterned into a desired shape and carry fine particles. In another aspect, it is preferable in a substrate according to the present embodiment that the fine particles be made of gold, silver, platinum, palladium, iridium, rhodium, osmium, ruthenium, nickel, cobalt, indium, copper, $TiO_2$, or $BaTiO_3$. Preferably, the fine particles are of the size (particles diameter of 1 nm to 100 nm) that can form a colloidal solution.

When the self-organizing material is nucleic acid (DNA or RNA), a substrate according to the present invention can be used as a functional conductive material. Nucleic acids (DNA or RNA) are functional conductive material with characteristic energy levels and specific properties. When doped in DNA or RNA, elements of specific species show considerable changes in their electrical properties.

In the base portion of DNA, a pigment can be intercalated by pai stacking. The base portion of RNA can interact with a pigment. Thus, in DNA with an intercalated pigment or RNA interacting with a pigment, irradiation of light excites the pigment and renders the DNA strand or RNA strand electrically conductive.

It is therefore possible to use the substrate as a functionally conductive material by intercalating a pigment to the DNA immobilized on the substrate, or by causing a pigment to interact with the RNA immobilized in the patterning substrate of the self-organizing material. That is, an optical switching material can be constructed that emits light according to the DNA or RNA pattern arranged on the substrate.

The pigment is not particularly limited; however, for reasons that DNA or RNA and the photo-excited pigment have close energy levels, use of acridine orange is preferable. Representative examples of intercalator include: ethidium bromide, octadecyl acridine orange, ferrocenyl naphthalene diimide, β-carboline, anthraquinone, a bisacridine viologen derivative, and a Ru complex.

A substrate according to the present invention can be used to prepare a photomask. A photomask refers to a mask blank with a patterned image (see Glossary of Technical Terms in Japanese Industrial Standards, 5th edition, page 1954, Japanese Standards Association), and an inorganic/metal material as represented by a chrome mask is used therefor.

When using a substrate according to the present invention as a photomask, the self-organizing material as a bio-material (for example, nucleic acid such as DNA or RNA) can be removed from the photomask at once by a chemical treatment using acids or alkalis, or a heat treatment. Thus, with a photomask using a substrate according to the present invention, the DNA or RNA immobilized in any pattern on the substrate can be used for microfabrication. Further, by degrading and removing the immobilized DNA or RNA after the process, the whole process can be simplified and various improvements, such as improved yield, can be expected.

The inventors of the present invention also found that the self-organizing material and the fine particles could directly bind together even when they have the same charge.

In one embodiment, the present invention provides a method for binding fine particles to a self-organizing material. In one aspect, a method according to the present embodiment preferably includes the steps of: obtaining a mixed solution by mixing a solution containing fine particles with a solution containing a self-organizing material; applying the mixed solution onto a substrate; and drying the mixed solution applied to the substrate. In a method according to the embodiment, the fine particles may have the charge different from that of the self-organizing material or may be electrically neutral. Preferably, the fine particles have the same charge as the solution containing the self-organizing material.

In a method for arranging fine particles on a substrate of metal oxide according to the present invention, the drying step may be performed by a method using a centrifugal separator, a method using a spin coater, or a method of blowing a dry inert gas or air. However, it is preferable that the drying method be performed by a method of blowing a dry nitrogen gas. As used herein, the "inert gas" is intended nitrogen gas or argon gas.

As described above, the inventors of the present invention accomplished the present invention by finding a method of conveniently immobilizing DNA and a method of extending DNA, using an $Al_2O_3$ ($\alpha$-$Al_2O_3$ (0001)) substrate and without any chemical surface modification (for example, APS process) that uses other molecules on the substrate. The novel method relies on hydrophilicity on a substrate surface, which is enhanced by the increased amount of hydroxy group by the acid solution process. Immobilization and extension of DNA can be enhanced using this simple method of cleaning the $Al_2O_3$ substrate.

The present invention is not limited to the description of the embodiments above, but may be altered by a skilled person within the scope of the claims. An embodiment based on a proper combination of technical means disclosed in different embodiments is encompassed in the technical scope of the present invention.

The following will describe the present invention in more detail based on Examples. Various changes, revisions, and modifications are possible by a person ordinary skill in the art within the scope of the claims set forth below.

EXAMPLES

Example 1

The $Al_2O_3$ substrate used in this study was processed as follows. The substrate was first heated for 5 minutes in a boiled phosphate solution, and then rinsed with ultrapure water: The substrate was then annealed for 2 hours at 1200° C. to 1300° C. under atmospheric pressure, in order to obtain an atomically flat surface. The surface of the $Al_2O_3$ substrate after annealing process had an atomically flat step structure.

A 5:43 mixture of hydrogen peroxide solution and ultrapure water was boiled and hydrochloric acid was added thereto (2/50 of the total volume). After bubbles had been formed in the mixture, the $Al_2O_3$ substrate with the step structure was dipped in the mixture for 5 minutes and then rinsed with ultrapure water.

FIG. 1a is a result of observation of a surface structure of $Al_2O_3$ substrate after acid treatment, using an atomic force microscope (Nanoscope IV, DI Instruments). It can be seen that rinsing did not alter the surface structure.

A $SrTiO_2$ substrate was annealed for 3 hours at 1.000° C. under oxygen flow conditions. The substrate surface after annealing process had an atomically flat step structure.

A 5:43 mixture of hydrogen peroxide solution and ultrapure water was boiled and hydrochloric acid was added thereto (2/50 of the total volume). After bubbles had been formed in the mixture, the $SrTiO_2$ substrate with the step structure was dipped in the mixture for 5 minutes and then rinsed with ultrapure water.

Figure 1B:
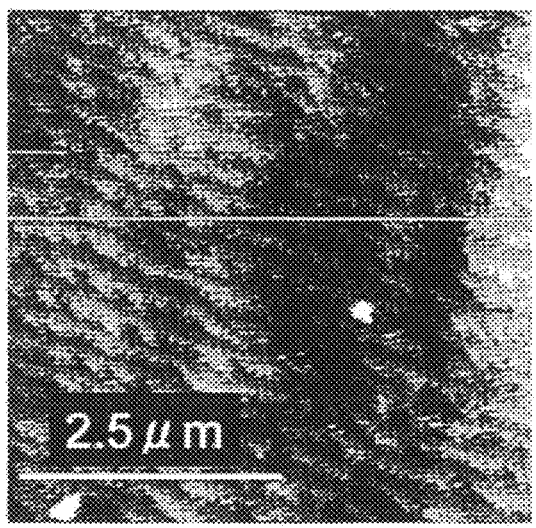
FIG. 1b is a diagram showing an AFM image of SrTiO$_2$ surface that has not been treated with an acid solution and is flat at atomic level.
Figure 1C:
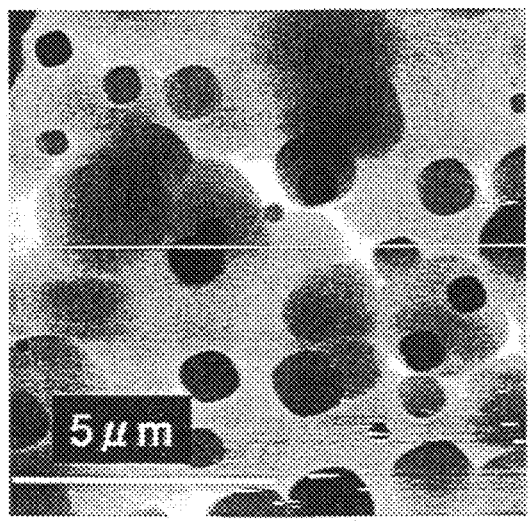
FIG. 1c is a diagram showing an AFM image of SrTiO$_2$ surface that has been treated with an acid solution.

FIGS. 1b and 1c are results of observation of a surface structure of $SrTiO_2$ substrate using an atomic force microscope (Nanoscope IV, DI Instruments). FIG. 1b shows a $SrTiO_2$ surface before washing, and FIG. 1c shows a $SrTiO_2$ surface after washing. Before washing, the surface had a flat step structure with a height of about 0.4 nm. The washing process etched the surface and generated recesses as deep as about 10 nm.

The foregoing results show that the $Al_2O_3$ substrate, which does not undergo changes in the surface structure by the washing process is more suitable.

Example 2

In order to immobilize and extend DNA, $\lambda$ DNA solution (Takara Corp.) was dropped on a substrate that had been subjected to a hydrophilic treatment. After 5 minutes, the substrate was dried by blowing a dry nitrogen gas onto a substrate surface: Under controlled gas pressure of about 0.1 MPa, the gas was blown from about a 45-degree angle with respect to the substrate surface. The DNA solution was dialyzed overnight prior to use. For comparison, substrates with and without acid treatment were used. FIG. 2 is an AFM image of DNA immobilized on a substrate surface at varying DNA concentrations. FIGS. 2a and 2b show results from surfaces with acid treatment. FIG. 2c shows a result from a surface subjected to annealing process alone. In a low-concentration solution (3 µg/ml), the isolated DNA molecules were extended and immobilized individually on the surface (FIG. 2a). Under high-concentration conditions (400 µg/ml), a network structure of DNA was observed (FIG. 2b). In contrast, on the substrate without acid treatment, slightly extended DNA molecules were observed even at the high-concentration conditions of FIG. 2b (FIG. 2c).

These results indicate that the acid-treated substrate can firmly adsorb DNA on the surface, and that the structure of DNA adsorbed on the substrate surface can be controlled by varying concentrations of DNA.

Example 3

Figure 3:
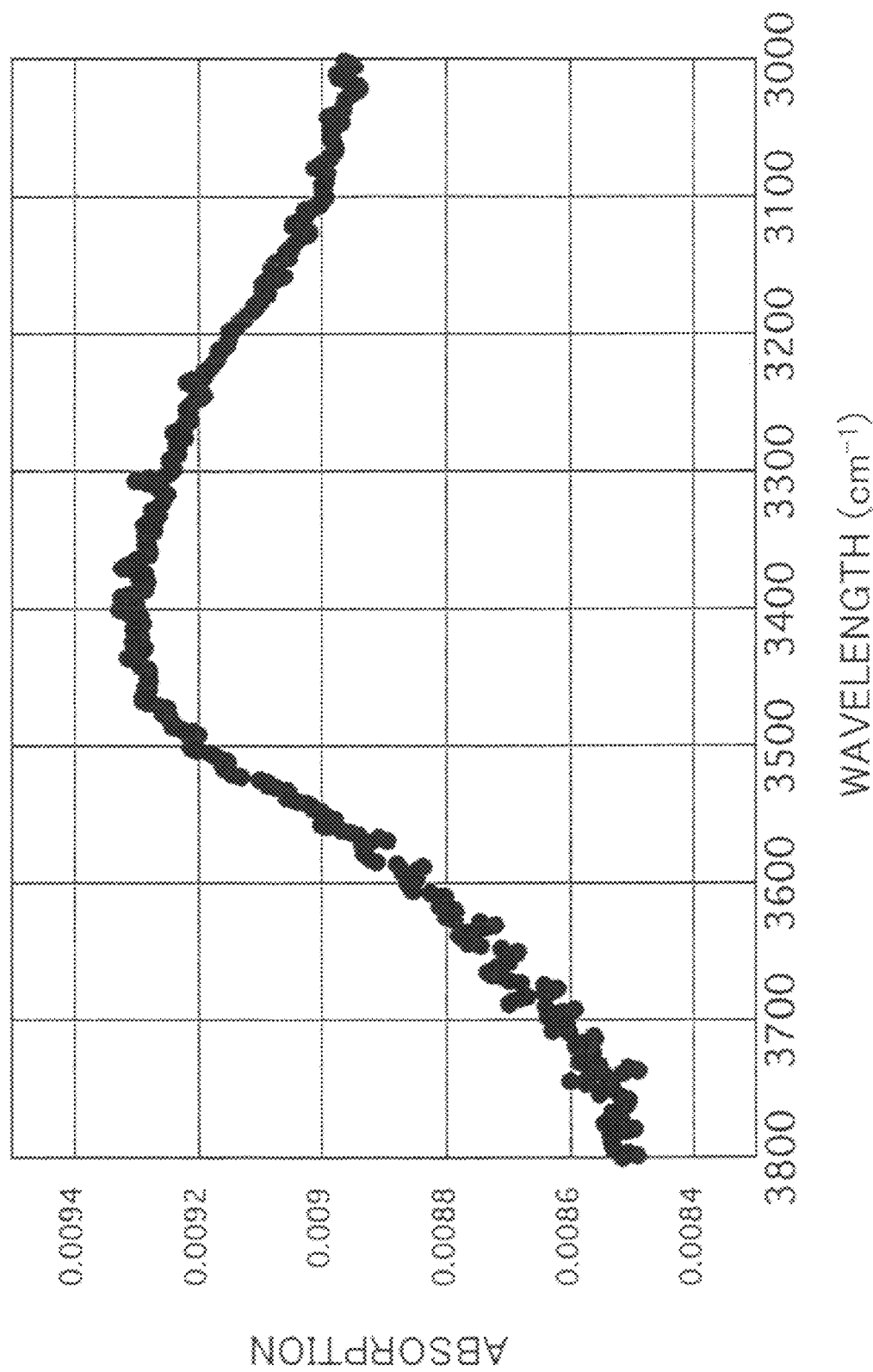
FIG. 3 is a graph representing a subtractive spectrum of infrared measurement performed before and after acid treatment, showing that the absorption peak at about 3500 cm$^{-1}$ is due to the hydroxy group on a substrate surface.
Figure 6A:
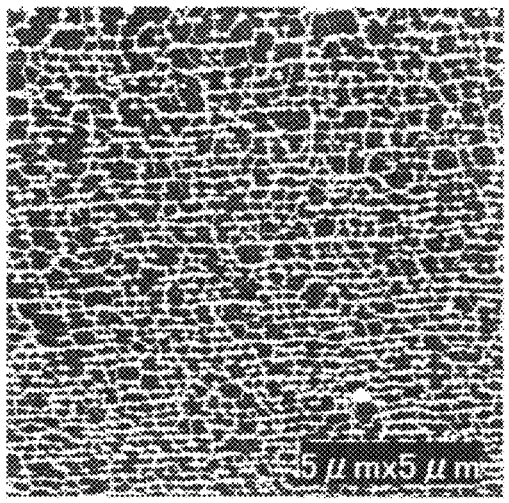
FIG. 6(a) is a diagram showing arrangements of gold nanoparticles that are formed on an Al$_2$O$_3$ substrate by removing a mixed solution of DNA solution and gold nanoparticle solution applied to the substrate, the mixed solution containing DNA and gold nanoparticles at a ratio of about 1:1 (moles of DNA/numbers of gold nanoparticles).
Figure 6B:
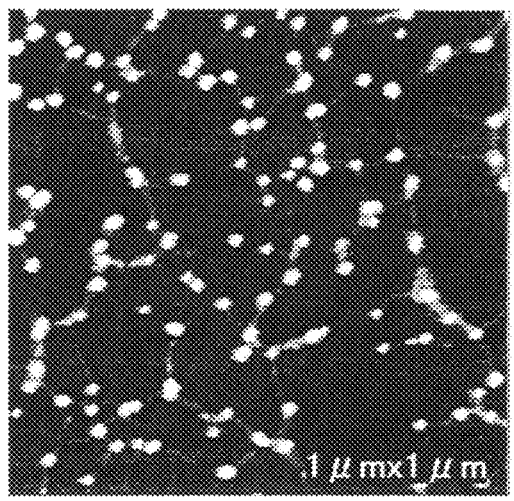
FIG. 6(b) is a diagram showing arrangements of gold nanoparticles that are formed on an Al$_2$O$_3$ substrate by removing a mixed solution of DNA solution and gold nanoparticle solution applied to the substrate, the mixed solution containing DNA and gold nanoparticles at a ratio of about 10:1 (moles of DNA/numbers of gold nanoparticles).
Figure 6C:
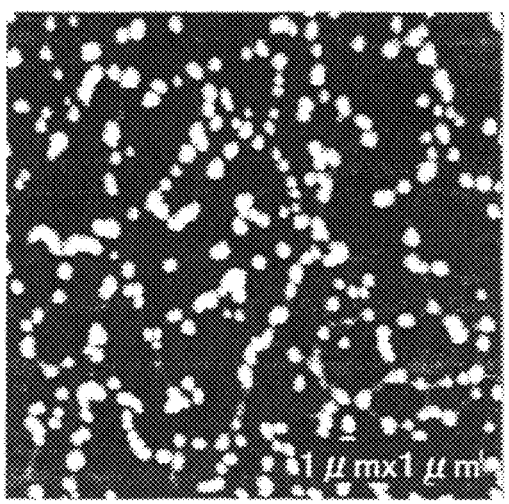
FIG. 6(c) is a diagram showing arrangements of gold nanoparticles that are formed on an Al$_2$O$_3$ substrate by removing a mixed solution of DNA solution and gold nanoparticle solution applied to the substrate, the mixed solution containing DNA and gold nanoparticles at a ratio of about 2:1 (moles of DNA/numbers of gold nanoparticles).
Figure 6D:
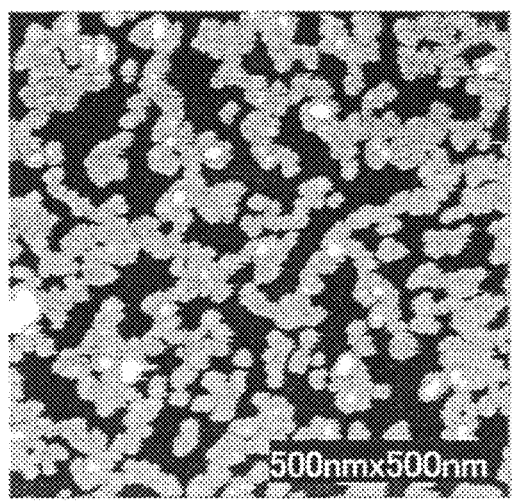
FIG. 6(d) is a diagram showing arrangements of gold nanoparticles that are formed on an Al$_2$O$_3$ substrate by removing a mixed solution of DNA solution and gold nanoparticle solution applied to the substrate, the mixed solution containing DNA and gold nanoparticles at a ratio of about 0.5:1 (moles of DNA/numbers of gold nanoparticles).

In order to examine effects of acid treatment on DNA immobilization and extension in more detail, infrared analysis was performed using 3 kinds of solvents. FIG. 3 represents a subtractive spectrum of infrared measurement performed before and after acid treatment. Measurement showed that the absorption maxima at 3500 cm$^{-1}$ was due to an increased amount of hydroxy group that had been bound to the surface.

The result coincides with the previous result that showed a structural change from Al—O—Al to Al—O—H. To find the cause, a spectrum from the phosphate group of the DNA molecules was measured. Data were below detection limit (results not shown).

For the measurement of surface energy, the contact angle of $Al_2O_3$ substrate was measured with water, diiodomethane or hexadecane, using a Sessible drop method (Kyowa interface science Co., Ltd.). Ambient temperature was maintained at 25° C. and the moisture at 40%. Average contact angles were found to be 5.8°, 37.5°, and 16.5° in water, diiodomethane and hexadecane, respectively. Surface free energy was calculated according to Young-Dupre equation and extended Fowkes equation:

$$W_{sl} = \gamma(1+\cos\theta_{sl})$$

$$W_{sl}/2 = (\gamma_s^d \cdot \gamma_l^d)^{1/2} + (\gamma_s^p \cdot \gamma_l^p)^{1/2} + (\gamma_s^h \cdot \gamma_l^h)^{1/2} \quad \text{[Equation 1]}$$

Here, γs and γl represent solid surface energy and liquid surface energy, respectively, and d, p, and s represent van der Waals force, dipole interaction, and hydrogen bonding, respectively.

TABLE 1

| | Surface energy | | | |
|---|---|---|---|---|
| | van der Waals force | Dipole interaction | Hydrogen bonding | Total |
| Acid treatment | 26.5 | 26.8 | 35.8 | 89.1 |
| No acid treatment | 27.4 | 6.4 | 36 | 69.8 |

As shown in Table 1, the surface energies due to van der Waals force, dipole interaction, and hydrogen bonding were estimated to be 26.5, 26.8, and 35.8, respectively, in the chemical treated sample. The total surface energy was thus estimated to be about 89.0. In the untreated sample, the surface energies were estimated to be 27.4, 6.4, and 36.0, and the total surface energy 69.8. The results indicate a quantitative increase of surface free energy by the action of the dipole interaction component.

It was found by the measurements that the covering of the substrate surface with the hydroxy group was due to both structural changes by the acid treatment and removal of foreign substances, and that the surface energy was influenced by the action of dipole interaction between hydroxy groups. It can be said from this that the hydrogen bonding between the hydroxy group on the substrate surface and the phosphate group of the DNA plays a role in the mechanism of immobilization. A previous study has shown that octadecyl phosphate strongly reacts with the $Al_2O_3$ surface to form a bulk(aluminoalkyl) phosphonate. Al—O—P bonds are also formed in the same manner.

Example 4

A DNA solution was observed with a fluorescent microscope by adding a fluorescent dye. To confirm effects of acid treatment, an APS-coated glass substrate (Matsunami glass corp.) was used as a control. APS treatment has been widely used for immobilization of DNA molecules on a substrate surface. The APS-coated glass is covered with the positively charged amino groups, and therefore the DNA with the negatively charged phosphate groups around the double helix is adsorbed on the substrate surface by the electrostatic force.

Two hundred micro liters of λ DNA solution (80 ng/μl) was mixed with 1 μM YO-PRO1 (Y-3603, Molecular probes Inc.). The mixture was then applied to the acid-treated substrate and the APS-coated glass. After one minute, the solution on the surface was dried by blowing a dry nitrogen gas, and a fluorescent image was observed with an optical microscope (Olympus) (FIG. 4). FIG. 4a shows the result of observation of APS-coated glass. FIG. 4b shows the result of observation of $Al_2O_3$ substrate.

These results showed that the immobilization of DNA was possible without any special modification to the substrate, and that the DNA could be immobilized in much the same way as with the modified substrate.

The fluorescent images of DNA molecules from the APS-coated glass and the acid-treated $Al_2O_3$ substrate show that the DNA has been immobilized on the substrate surface and extended thereon. It is notable that the amount of DNA adsorbed on the $Al_2O_3$ substrate without any chemical modification was about the same as that on the APS-coated glass.

In sum, by a very simple treatment with an acid solution, the inventors of the present invention immobilized and extended DNA molecules on the atomically flat $Al_2O_3$ substrate. The surface treatment with acid solution enhanced hydrophilicity and thereby immobilization of DNA on the surface by hydrogen bonding. Minimum structural changes are needed owning to the atomically flat surface, and the $Al_2O_3$ substrate is optically transparent in the visible light range and is electrically insulating. This makes the simple method useful as a basic sample preparation technique for the observation of DNA or a DNA-protein complex, and for the measurement of electrical mobility.

Example 5

A DNA solution and a gold nanoparticle solution were applied to $Al_2O_3$ substrates, and adsorption on the substrates was observed (FIG. 5). FIG. 5a shows the substrate after a Poly(dA)-Poly(dT) DNA solution that had been applied to the substrate was removed with a spin coater. The DNA concentration was 250 μg/ml, and the speed of the spin coater was 800 rpm. As can be seen from above, a random network structure of DNA was formed on the $Al_2O_3$ substrate. FIG. 5b shows the substrate after the gold nanoparticle solution that had been applied on the substrate was removed with a spin coater. The concentration of gold particles was $10^{15}$ particles/ml, and the speed of the spin coater was 500 rpm. It can be seen from above that the gold particles were randomly distributed over the $Al_2O_3$ substrate.

These results indicate that the adsorption of DNA and gold nanoparticles on the substrate occurs independently of the step structure of the $Al_2O_3$ substrate.

Example 6

By spreading a mixture of DNA solution and gold fine particle solution over the surface of the $Al_2O_3$ substrate, a one-dimensional arrangement of gold particles can be obtained. Samples were prepared as follows. A 4:1 mixture of a DNA solution (250 μg/ml) (Poly(dA)-Poly(dT)) and a solution containing about $6\times10^{13}$ gold particles/ml (diameter of 5 nm) was prepared. The mixture was dropped on the substrate surface and the solution on the substrate was removed using a spin coater. FIG. 6 shows a result of observation of the substrate surface with an atomic force microscope (Seiko Instruments Inc.).

As shown in FIGS. 6(a) through 6(d), the gold fine particles were selectively arranged only on DNA portions on the step structure of the $Al_2O_3$ substrate. This suggests that the arrangement of gold fine particles on the substrate surface can be controlled very easily only with the use of a spin coater. A preferable ratio of DNA and gold nanoparticles in the mixture was found to be 100:1 to 0.5:1 (moles of DNA/numbers of gold nanoparticles).

Figure 8:
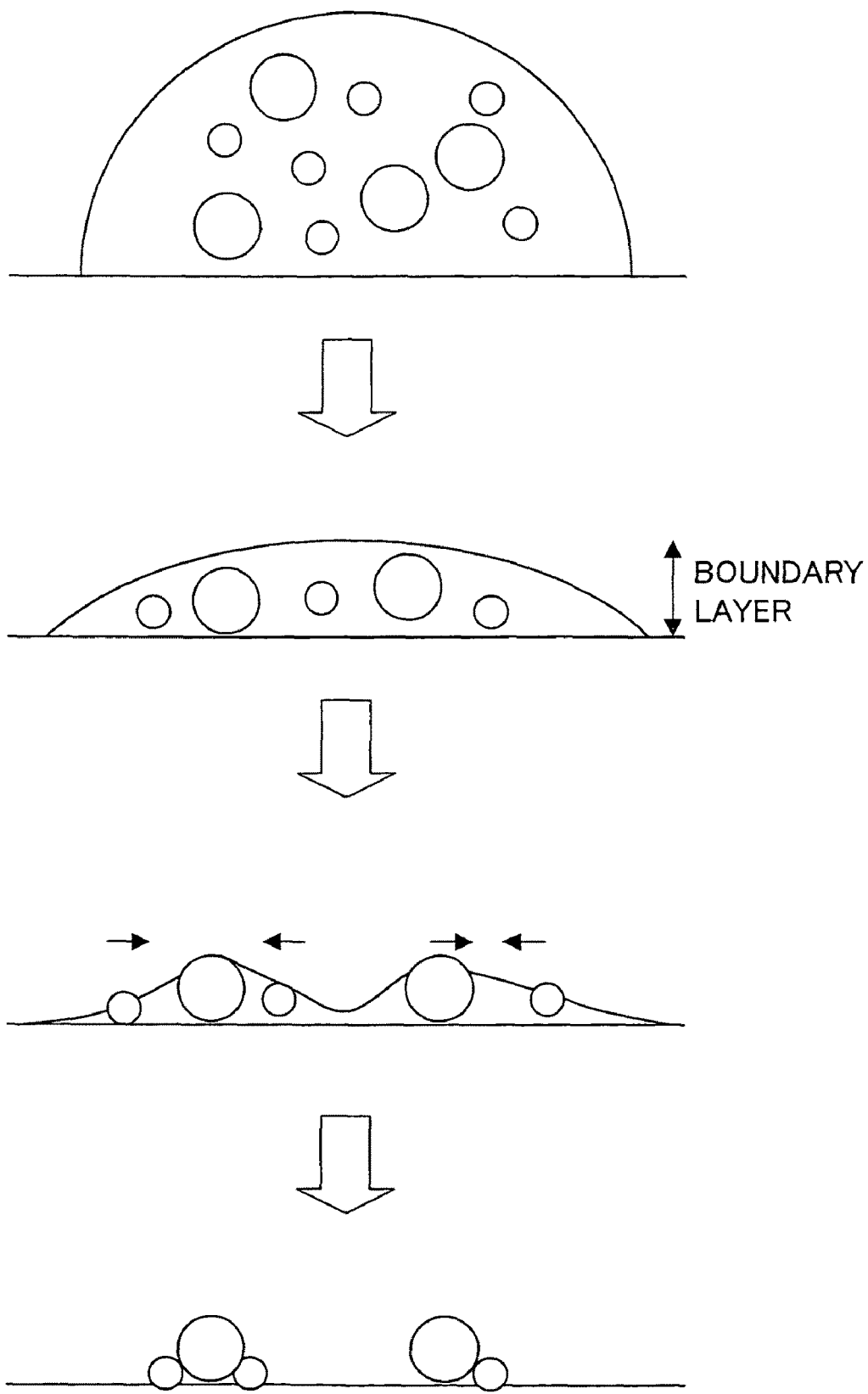
FIG. 8 is a diagram schematically showing processes by which gold nanoparticles are arranged on an Al$_2$O$_3$ substrate.

FIG. 7a schematically illustrates the result shown in FIG. 6. FIG. 7b is a result of observation with AFM. The nanoparticles are selectively adsorbed on edges of the step structure of the $Al_2O_3$ substrate and on DNA network portions. This phenomenon is considered to be due to capillary action. In the drying step, the water traps the nanoparticles. FIG. 8 schematically illustrates how arrangements of nanoparticles occur by capillary action.

Example 7

Figure 9:
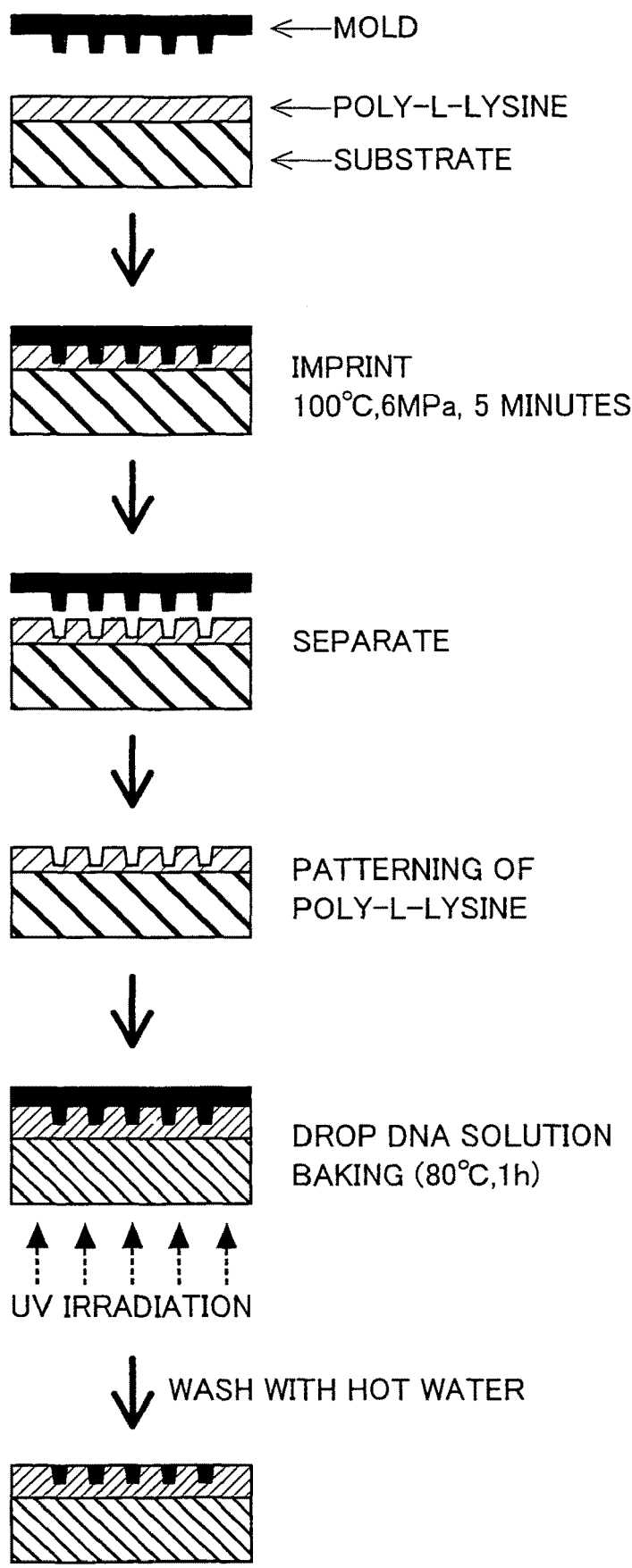
FIG. 9 is a diagram showing procedures of a fabrication method of a self-organizing material patterning substrate according to the present invention.

FIG. 9 represents procedures of a patterning process suitable for a method for arranging fine particles on a substrate in a desired shape according to the present invention. As the substrate, a glass substrate of Matsunami glass corp., prepared by treating a glass slide substrate with a poly-L-lysine coating, was used (for example, product number SD10011, product name Poly-Lysine coat-type).

Next, using a nano-imprint device (product of OBDUCAT AB), a mold was pressed against the poly-L-lysine coating (simply "PLL coating" hereinafter) for 5 minutes under 6 MPa at a temperature of 100° C. (imprinting). At a maintained pressure (6 Mpa), the temperature was lowered to room temperature to harden the PLL coating. After hardening the PLL coating, the mold was separated from the substrate to obtain irregular patterns for DNA on the PLL coating.

As the mold, a Si wafer was used that had been prepared by attaching a $SiO_2$ thermally-oxidized film on Si. Using a stepper, the $SiO_2$ thermally-oxidized film was patterned by lithography.

Next, about a 100 μl of an aqueous solution of powdery salmon sperm DNA (Nippon Kagaku Shiryo Kabushiki Kaisha) (1 μg/ml) adjusted with 0.3 mol/l sodium chloride+0.03 mol/l sodium citrate was dropped over the surface of the imprinted PLL-coated glass. The substrate was then heated (baked) with a hot plate for 1 hour at 80° C. to evaporate moisture and promote immobilization of DNA and the PLL coating. This was followed by irradiation of UV light (254 nm) with a UV irradiator for 5 minutes to further promote immobilization of DNA and the PLL coating. Then, the substrate was washed first by water and then hot water (about 80° C.) to remove residual DNA remaining on the substrate surface. As a result, a self-organizing material patterning substrate was obtained.

Figure 10A:
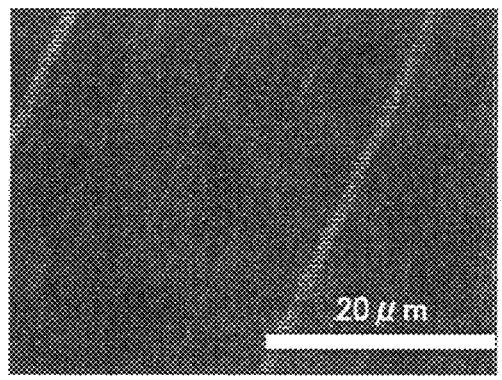
FIG. 10a is a diagram showing a result of observation of fluorescent-stained DNA immobilized on a specific pattern of a self-organizing material patterning substrate according to the present invention.
Figure 10B:
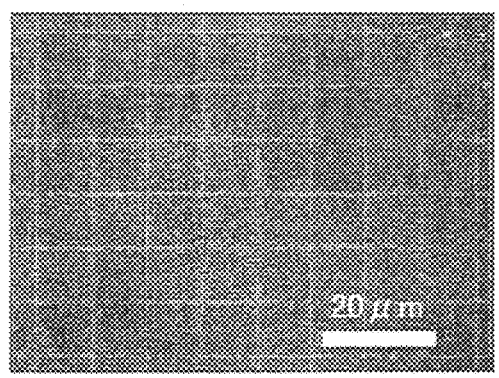
FIG. 10b is a diagram showing a result of observation of fluorescent-stained DNA immobilized on a specific pattern of a self-organizing material patterning substrate according to the present invention.
Figure 10C:
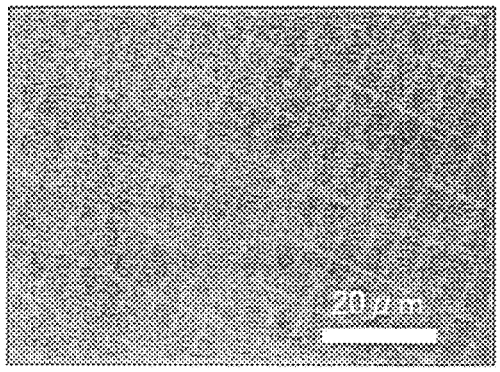
FIG. 10c is a diagram showing a result of observation of fluorescent-stained DNA immobilized on a specific pattern of a self-organizing material patterning substrate according to the present invention.
Figure 10D:
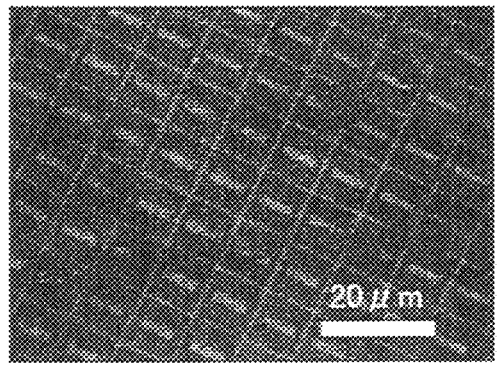
FIG. 10d is a diagram showing a result of observation of fluorescent-stained DNA immobilized on a specific pattern of a self-organizing material patterning substrate according to the present invention.

FIGS. 10a through 10d are results of fluorescent microscope observation (Olympus, ×100) of DNA patterns immobilized on the substrate. The observation was made by staining DNA with a fluorescent dye dropped on the substrate. In FIGS. 10a through 10d, white lines indicate DNA immobilized on the substrate. FIG. 10a shows DNA immobilized in parallel lines. In FIG. 10b, DNA is immobilized on sides of square grids. FIG. 10c shows DNA immobilized on sides of rectangular grids. In FIG. 10d, DNA is immobilized on sides of square grids, and in each grid by forming rectangles.

Figure 11A:
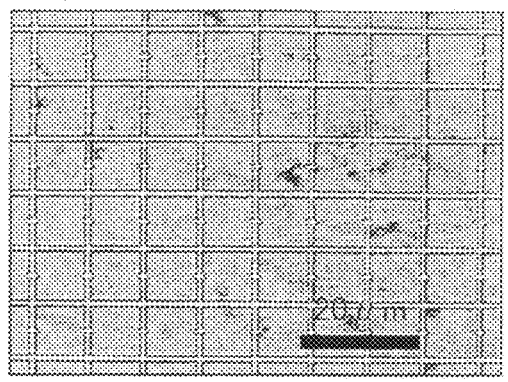
FIG. 11a is a diagram showing a result of observation of a mold pattern with square grids.
Figure 11B:
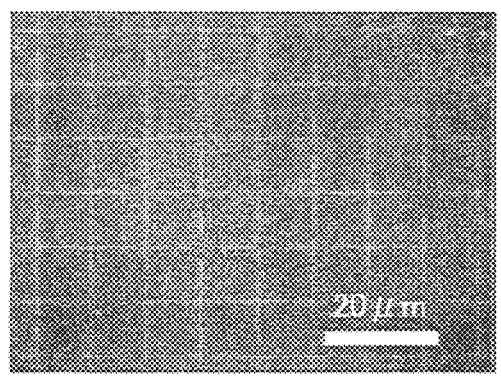
Figure 11C:
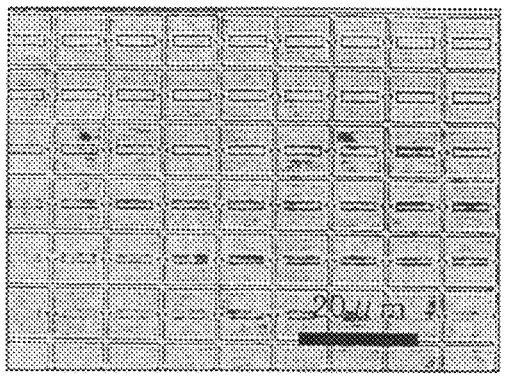
FIG. 11c is a diagram showing a result of observation of a pattern in which rectangular molds are formed in a mold with square grids.
Figure 11D:
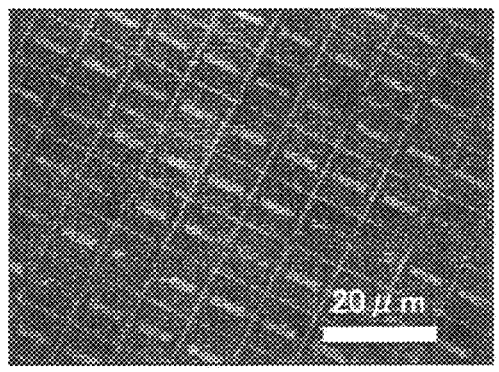
FIG. 11d is a diagram showing a result of observation of a DNA pattern of a substrate immobilizing DNA on the mold of FIG. 11c.

FIGS. 11a through 11d show molds that have been printed with DNA-immobilizing patterns using silicon dioxide, and results of observation of substrate patterns after DNA has been immobilized thereon following mold imprinting. FIG. 11a shows a mold with square grids. FIG. 11b shows a substrate that has been imprinted with the mold of FIG. 11a and on which DNA is immobilized. FIG. 11c shows a mold with rectangular molds formed in square grids. FIG. 11d shows a substrate that has been imprinted with the mold of FIG. 11c and on which DNA is immobilized.

Using the DNA patterns of the patterning substrates, DNA was modified with gold colloids to arrange the gold colloids on the surface of DNA. First, a commercially available gold colloid solution (Tanaka Kikinzoku Kabushiki Kaisha, particle diameter 40 nm, concentration 0.006 wt %.) was centrifuged (15000 rpm, 1 hour). The precipitate was removed and the solution was centrifuged again (15000 rpm, 1 hour). The resulting concentrated gold colloids were diluted about 10 times with water to prepare a gold colloid solution. Next, the substrate with the DNA pattern was dipped in the gold colloid solution for about 2 hours to modify the DNA with the gold colloids. This was followed by taking out the substrate from the gold colloid solution, and removing excess moisture from the substrate surface by blowing.

Figure 12:
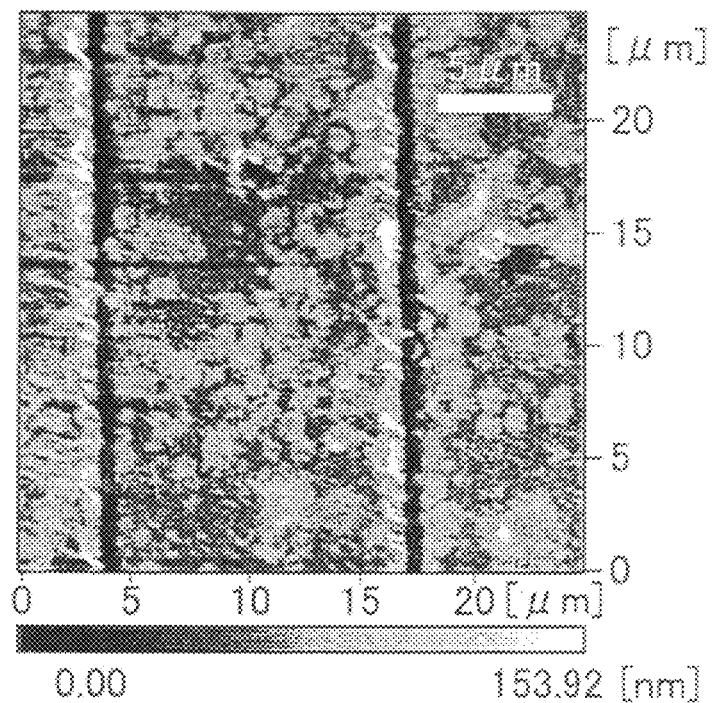
FIG. 12a is a diagram showing a result of atomic force microscope observation of a self-organizing material patterning substrate before modification with gold colloids.
FIG. 12b is a diagram showing a result of atomic force microscope observation of a self-organizing material patterning substrate after modification with gold colloids.
Figure 12:
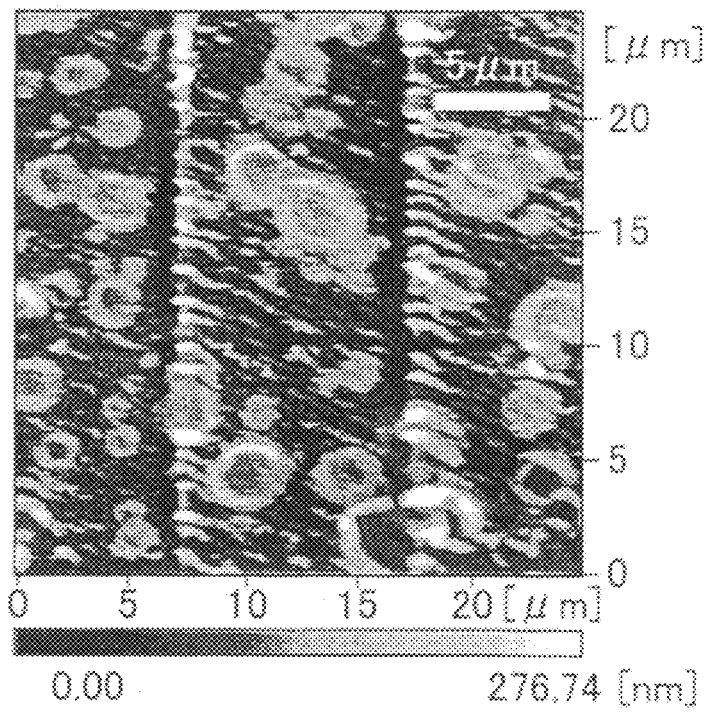

FIG. 12a shows a result of observation before gold colloid modification. FIG. 12b shows a result of observation of the substrate after gold colloid modification. For observation, an atomic force microscope (Seiko Instruments Inc.) was used. As shown in FIG. 12b, the gold colloids were arranged according to the pattern of DNA immobilized on the substrate shown in FIG. 12a. Note that, the numbers "0.00-153.92 nm" and "0.00-276.74 nm" respectively shown at the bottom of FIGS. 12a and 12b indicate heights, corresponding to the shade of horizontal bars shown above these numbers.

Comparative Example

Figure 13A:
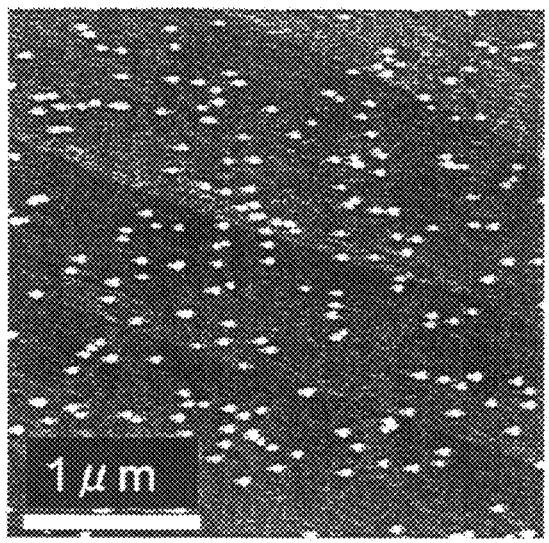
FIG. 13a is a diagram according to a comparative example of the present invention, showing gold particles adsorbed in a substrate when the DNA concentration used to fabricate a substrate according to the present invention is doubled.

Ten micro liters of Poly(dA)-Poly(dT) solution (1250 ng/μl) was mixed with 15 μl of Au fine particle solution to prepare a mixed solution of Poly(dA)-Poly(dT) (500 ng/μl) and 5-nm gold fine particles ($1\times10^{14}$ particles/ml). The mixture was allowed to stand overnight at 4° C. The solution was dropped on acid-treated $Al_2O_3$ substrate, which was then spun with a spin coater at 500 rpm for 1 minute to remove excess solution. FIG. 13a shows a result of observation of a substrate surface. Under these conditions, there was no selective adsorption of the gold particles on the step edges, but the gold fine particles were randomly adsorbed on the substrate.

Figure 13B:
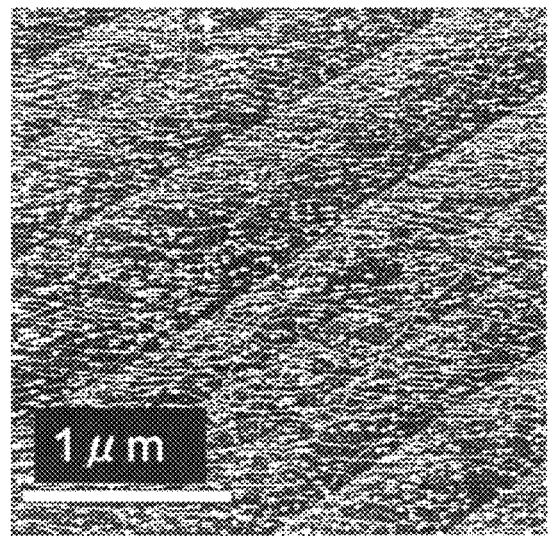
FIG. 13b is a diagram according to a comparative example of the present invention, showing gold particles adsorbed in a substrate when the DNA concentration used to fabricate a substrate according to the present invention is reduced in half.

Next, by mixing a λ DNA solution (300 ng/μl) and a Au fine particle solution at a 1:1 ratio, a mixed solution was prepared containing λ DNA (150 ng/μl) and 5-nm gold fine particles ($1\times10^{14}$ particles/ml). The mixture was allowed to stand overnight at 4° C. The solution was dropped on acid-treated $Al_2O_3$ substrate, which was then spun with a spin coater at 500 rpm for 1 minute to remove excess solution. FIG. 13b shows a result of observation of a substrate surface. Under these conditions, there was no selective adsorption of the gold particles on the step edges, but the gold fine particles were randomly adsorbed on the substrate.

The foregoing showed that the fine particles could be orderly arranged on the substrate, preferably at a DNA concentration of 250 ng/μl and a rotational speed of spin coater at 500 rpm.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention enables a hydroxy group to be introduced onto a surface of an acid-treated metal oxide (for example $Al_2O_3$, ZnO, $TiO_2$) substrate, and thereby allows DNA to be directly and firmly bonded to the substrate via the hydroxy group. The present invention can be used to form individual molecules of extended DNA or a network structure of DNA bundles on a substrate, surface. Conventionally, it has been difficult to control arrangements of gold fine particles over a wide area. With the present invention, arrangement control of gold fine particles is possible over a wide area of the substrate.

The present invention is highly useful in applications such as structure analysis and DNA electronics. The invention is applicable to construction of nanoscale circuits, functional conductive materials, and photomasks.

The invention claimed is:

1. A method for immobilizing a self-organizing material on a substrate of metal oxide, comprising the steps of:
   applying to the substrate an acid solution capable of introducing a hydroxy group on a surface of the substrate; and
   applying a solution containing the self-organizing material onto the substrate after the acid solution is removed from the substrate;
   wherein the self-organizing material is a nucleic acid, a protein, an amino acid, a lipid, or a sugar.

2. The method as set forth in claim 1, wherein the metal oxide is $Al_2O_3$, $ZnO$, $TiO_2$, $SiO_2$, $ZrO_2$, $SrTiO_2$, $LaAlO_3$, $Y_2O_3$, MgO, GGG, YIG, LiTaO, LiNbO, $KTaO_3$, $KNbO_3$, or NdGaO3.

3. The method as set forth in claim 1, further comprising the step of drying the self-organizing material-containing solution applied to the substrate.

4. The method as set forth in claim 3, wherein the drying step is performed by blowing a dry inert gas or air.

5. A substrate on which a self-organizing material is immobilized, the self-organizing material binding to a hydroxy group that has been formed on a surface of the substrate by acid treatment of the substrate, wherein the self-organizing material is a nucleic acid, a protein, an amino acid, a lipid, or a sugar.

6. The substrate as set forth in claim 5, wherein the substrate is a metal oxide selected from $Al_2O_3$, $ZnO$, $TiO_2$, $SiO_2$, $ZrO_2$, $SrTiO_2$, $LaAlO_3$, $Y_2O_3$, MgO, GGG, YIG, LiTaO, LiNbO, $KTaO_3$, $KNbO_3$, or $NdGaO_3$.

7. The substrate as set forth in claim 5, wherein the self-organizing material carries fine particles.

8. The substrate as set forth in claim 7, wherein the fine particles comprise gold, silver, platinum, palladium, iridium, rhodium, osmium, ruthenium, nickel, cobalt, indium, copper, $TiO_2$, or $BaTiO_3$.

9. The substrate as set forth in claim 7, wherein the fine particles have a particle diameter in a range of 1 nm to 100 nm.

10. The method as set forth in claim 1, wherein said acid solution consists of a mixture of hydrogen peroxide solution and hydrochloric acid solution.

11. The method as set forth in claim 1, wherein a hydroxy group is created on the surface of the substrate by applying the solution containing the self-organizing material onto the substrate.

12. The method as set forth in claim 11, wherein a self-organizing material is bonded directly to the substrate via the hydroxy group, the hydroxy group being created on the surface of the substrate by applying the solution containing the self-organizing material onto the substrate.

13. The substrate as set forth in claim 5, wherein said acid treatment is conducted by acid solution consisting of a mixture of hydrogen peroxide solution and hydrochloric acid solution.

14. The substrate as set forth in claim 13, wherein said self-organizing material is bonded directly to the substrate via the hydroxy group.

* * * * *